(12) United States Patent
Hyun et al.

(10) Patent No.: US 7,813,385 B1
(45) Date of Patent: Oct. 12, 2010

(54) ADAPTIVE LINK DELAY MANAGEMENT IN WIRELESS LINK SYSTEMS

(75) Inventors: Sang Kyoon Hyun, Campbell, CA (US); Bretton Douglas, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1035 days.

(21) Appl. No.: 10/791,441

(22) Filed: Mar. 1, 2004

(51) Int. Cl.
*H04J 3/06* (2006.01)
*H04J 3/07* (2006.01)
*H04B 17/00* (2006.01)

(52) U.S. Cl. ............... 370/508; 370/503; 370/519; 455/67.16

(58) Field of Classification Search ........... 370/445, 370/466, 503–508, 519; 710/18
See application file for complete search history.

(56) References Cited

U.S. PATENT DOCUMENTS

| | | | |
|---|---|---|---|
| 6,374,311 B1 * | 4/2002 | Mahany et al. | 710/18 |
| 6,674,730 B1 * | 1/2004 | Moerder | 370/316 |
| 6,681,099 B1 * | 1/2004 | Keranen et al. | 455/67.16 |
| 6,697,382 B1 * | 2/2004 | Eatherton | 370/503 |
| 6,961,311 B2 * | 11/2005 | Rakotoarivelo et al. | 370/238 |
| 6,965,942 B1 * | 11/2005 | Young et al. | 709/232 |
| 6,980,800 B2 * | 12/2005 | Noerpel et al. | 455/434 |
| 6,990,116 B1 * | 1/2006 | Young et al. | 370/445 |
| 7,006,534 B1 * | 2/2006 | Nemoto | 370/508 |
| 2003/0161340 A1 * | 8/2003 | Sherman | 370/445 |
| 2004/0141522 A1 * | 7/2004 | Texerman et al. | 370/466 |

OTHER PUBLICATIONS

N. Abramson, "The Aloha System—Another Alternative for Computer Communications", 1970 Fall Joint Computer Conferences, AFIPS Conference Proceedings, AFIPS Press, Montvale, NJ, vol. 37, pp. 281-285, 1970.

Pejman Roshan et al., 802.11 Wireless LAN Fundamentals, pp. 24-36, Cisco Press, Indianapolis, Indiana, 2004.

* cited by examiner

*Primary Examiner*—Patrick N Edouard
*Assistant Examiner*—Huy C Ho
(74) *Attorney, Agent, or Firm*—Cindy Kaplan (57) ABSTRACT

Systems and methods for adapting IEEE 802.11 wireless communications for environments involving long propagation delays. Improved system throughput and stability are provided. Propagation delays are measured systematically and used to adjust contention timing boundaries and a common time slot duration. This reduces the probability of collision in the CSMA/CA mode of the IEEE 802.11 standard. One particular application is a point-to-multipoint campus bridge network.

21 Claims, 11 Drawing Sheets

ADAPTIVE LINK DELAY MANAGEMENT IN WIRELESS LINK SYSTEMS

BACKGROUND OF THE INVENTION

The present invention relates to wireless networks, and more particularly to systems and methods for improving system timing.

Wireless bridge systems can efficiently and inexpensively interconnect data packet networks in campus areas by utilizing the unlicensed 2.4 GHz ISM band and 5 GHz UNIT bands. It is desirable to use popular wireless local area network (WLAN) standards such those belonging to the IEEE 802.11 family. In particular, the medium access control (MAC) procedures in the IEEE 802.11 standard can be used to coordinate and share the wireless medium between bridge stations. A problem arises in that the IEEE 802.11 MAC protocols assume that all wireless links have radio propagation delays of at most 1 microsecond. However, a point-to-multipoint wireless bridge system may have links that are miles long. Propagation delays on these links can be tens of microseconds, and can vary sharply among links.

The primary access protocol for 802.11 networks employs so-called "CSMA/CA" (Carrier-sense multiple access with collision avoidance) techniques. Contention-free periods are optionally provided within this CSMA/CA scheme. During contention periods, 802.11 stations can transmit if they believe the shared medium is free. The medium may be deemed to be not free based on either physical layer detection of a current transmission or based on a MAC layer detection of a current transmission. The MAC layer detection depends on monitoring of a duration field in received packets. The duration field may be found in the packet itself, or in a Request to Send (RTS) or Clear to Send message preceding the packet. When a new packet, RTS, or CTS is heard, a timer (the so-called NAV timer) can be set based on this duration field. Until this timer expires, the medium is considered to be busy. After a busy time is completed, each station will continue to defer transmission for a duration defined in part as a multiple of a locally computed random number and a system slot time.

When there is no shared understanding of system timing, there is a much higher probability of collisions due to breakdown of the MAC layer collision avoidance mechanism. Expiration of a prospective transmitter's NAV timer may not be a realistic indication of medium availability from the perspective of the intended receiver. At the conclusion of the busy period, a transmitter that begins a transmission right at the beginning of a slot may potentially collide with other transmitters that are beginning transmission on that slot or some portion of the previous slot due to the varying understanding of the slot boundaries and delayed detection of simultaneous transmissions due to link propagation delays. As link distances increase, packet collision probabilities will also increase unless timing boundaries are well understood at all stations.

Furthermore, physical layer carrier sense mechanisms may not be helpful in a wireless campus network due to the well-known hidden terminal problem. A root bridge of the wireless campus network typically uses an omni-directional antenna while the non-root bridges use directional antennas pointed at the root bridge. Thus the root bridge may hear multiple simultaneous transmissions from non-root bridges that collide because they do not hear each other. Thus, much larger collision probabilities can be expected when 802.11 techniques are extended to campus-scale wireless networks.

Figure 1A:
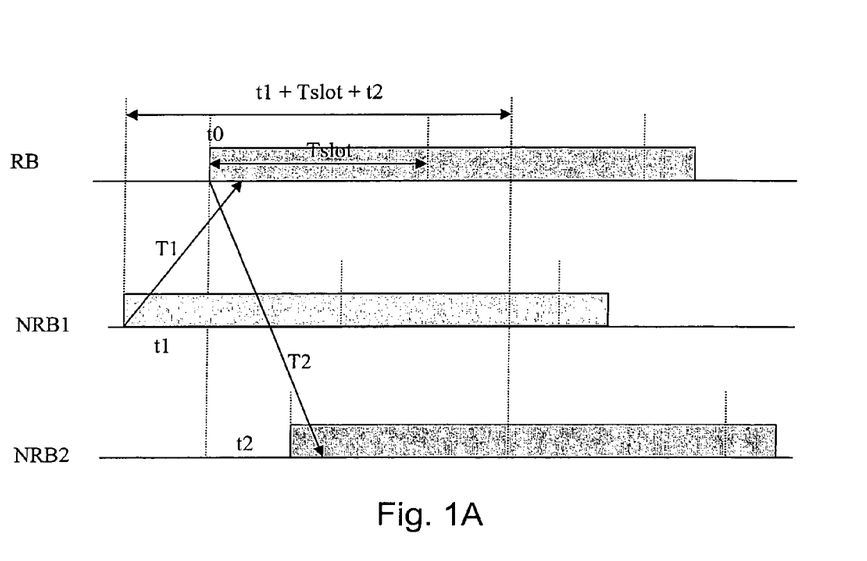
FIG. 1A depicts problems with timing of transmissions in a point-to-multipoint wireless network with significant propagation delays.

FIG. 1A depicts a simple example indicative of the type of problems that may arise. A wireless network includes a root bridge (RB) and two non-root bridges (NRB1 and NRB2).

1) NRB1 starts to transmit a frame, t1 before the timing boundary of RB (t0). NRB1 and NRB2 cannot hear each other.
2) RB consider the wireless medium "idle" if t1 is less than the propagation delay between RB and NRB1 (T1). Then RB starts to send a frame at t0.
3) NRB2 consider the wireless medium "idle" if t2 is less than the propagation delay (T2) between RB and NRB2. Then NRB2 starts to send a frame at to+t2.
4) The packet collision duration for the $1^{st}$ slot of RB is therefore expanded to t1+Tslot+t2.
5) The maximum packet collision duration for the $1^{st}$ slot of RB is T1+Tslot+T2. Thus average packet collision probability also increases in proportion to 1+(T1+T2)/(2*Tslot).

A more complete quantitative analysis of this effect will be presented later in this document. What is needed are systems and methods for adapting 802.11 techniques to networks with larger propagation delays such as campus point-to-multipoint wireless networks.

SUMMARY OF THE INVENTION

Embodiments of the present invention provide systems and methods for adapting IEEE 802.11 wireless communications for environments involving long propagation delays. Improved system throughput and stability are provided. Propagation delays are measured systematically and used to adjust contention timing boundaries and a common time slot duration. This reduces the probability of collision in the CSMA/CA mode of the IEEE 802.11 standard. One particular application is a point-to-multipoint campus bridge network.

A first aspect of the present invention provides a method for operating a point-to-multipoint wireless communication network. The method includes: measuring link delays between a root bridge and a plurality of non-root bridges and using the measured link delays to coordinate transmissions in a CSMA/CA scheme.

A second aspect of the present invention provides a method for operating a node in a point-to-multipoint wireless communication network. The method includes: receiving a measured link delay and a system slot time from another node and using the measured link delay and the system slot time to coordinate transmissions in a CSMA/CA scheme.

A third aspect of the present invention provides apparatus for operating a node in a point-to-multipoint wireless communication network. The apparatus includes a link delay counter that measures delays between a root bridge and a plurality of non-root bridges and a MAC processor that uses the measured link delays to coordinate transmissions in a CSMA/CA scheme.

A fourth aspect of the present invention provides apparatus for operating a node in a point-to-multipoint wireless communication network. The apparatus includes: a physical layer block that receives a measured link delay and a system slot time from another node and a MAC layer processor that uses the measured link delay and the system slot time to coordinate transmissions in a CSMA/CA scheme.

Further understanding of the nature and advantages of the inventions herein may be realized by reference to the remaining portions of the specification and the attached drawings.

DESCRIPTION OF SPECIFIC EMBODIMENTS

Representative Network Environment

Figure 1B:
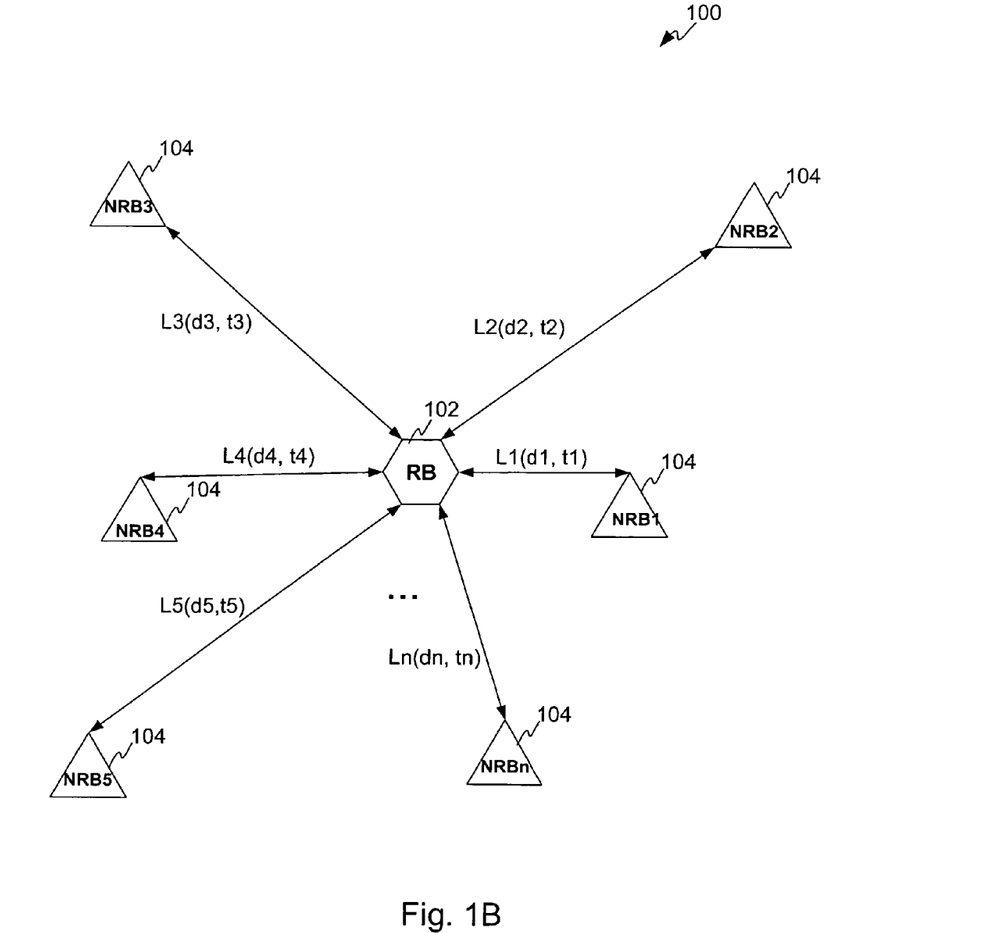
FIG. 1B depicts a point-to-multipoint wireless network according to one embodiment of the present invention.

Embodiments of the present invention will be described with reference a representative wireless communication network 100 as depicted in FIG. 1B. Network 100 is a point-to-multipoint wireless network. All communication is either to or from a root bridge 102. The other nodes are non-root bridges 104 denoted as NRBx. Each non-root bridge 104 communicates with root bridge 102 via a link Lx which has length dx and a delay tx.

Communication is in accordance with one of the variants of the IEEE 802.11 standard such as, e.g., 802.11a, 802.11b, 802.11g, etc. Generally speaking, the different flavors of 802.11 vary in their physical layers but are highly similar in their MAC layer operation. All of the relevant specification documents are incorporated herein in their entirety for all purposes.

Figure 2:
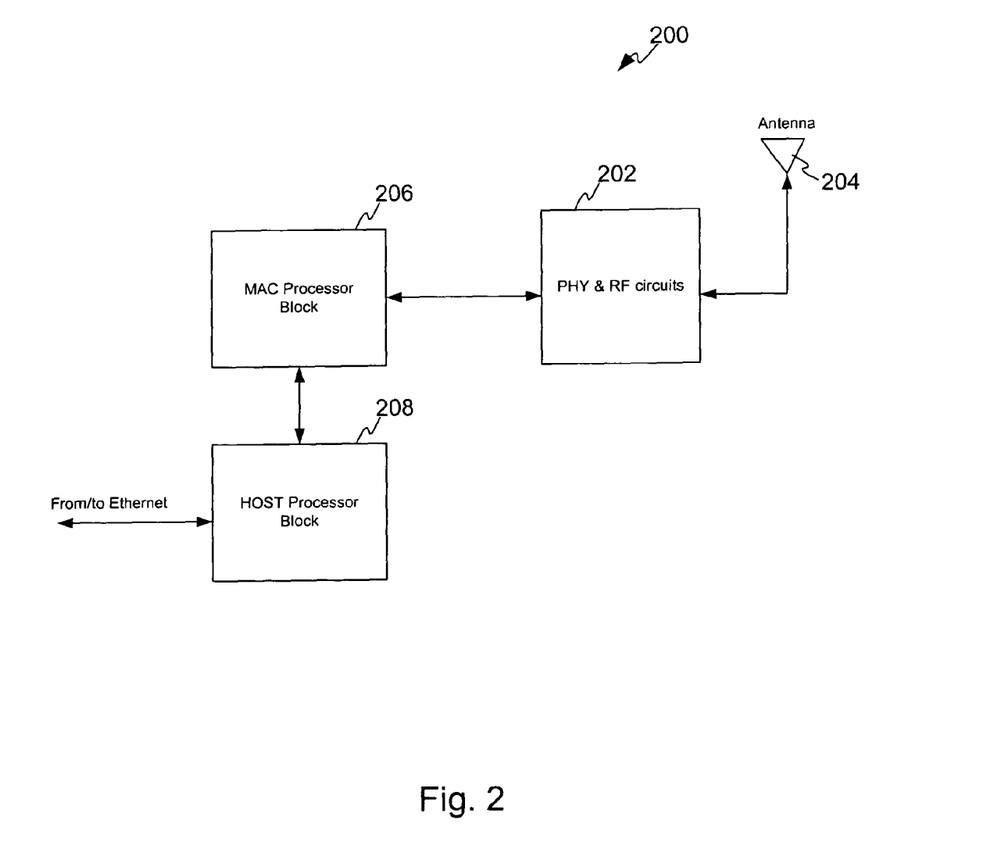
FIG. 2 depicts elements of a bridge station according to one embodiment of the present invention.

FIG. 2 depicts a block diagram of a typical bridge station 200 in network 100 according to one embodiment of the present invention. A physical layer/RF block 202 transmits and receives RF signals via an antenna 204. Physical layer/RF block 202 incorporates circuitry to perform functions including modulation, demodulation, upconversion, downconversion, conversion between digital and analog, low noise amplification of received signals, and power amplification of signals to be transmitted. Physical layer/RF block 202 operates in accordance with the relevant flavor of the IEEE 802.11 standard. A MAC layer processor 206 implements MAC layer functionality required by the IEEE 802.11 standard including timing of transmit and receive operations and framing/deframing. A host processor block 208 performs overall control and exchanges data with a local network via an Ethernet connection. Any functionality of bridge station 200 may be accomplished by software that would be stored on a computer-readable storage medium such as, e.g., a flash memory, other type of memory, hard drive, etc. Software for performing such functions may be transferred on a storage medium such as, e.g., a floppy disk, CD-ROM, DVD-ROM, a carrier signal, etc.

An overview of 802.11 MAC layer timing coordination will be useful background for the discussion that follows. Two coordination mechanisms are provided by 802.11 systems. One referred to as the distributed coordination function (DCF). This is a CSMA/CA mechanism roughly similar to that used in IEEE 802.3 Ethernet networks. The other is a contention-free access protocol. This mechanism is referred to as the point coordination function (PCF).

The discussion here will focus on the distributed coordination function. Before transmitting, a node will decide whether the wireless medium is busy or idle. The medium may be determined to be busy because the physical layer hears another transmission or because the MAC layer knows that the medium will be busy as will now be explained.

Each node maintains a timer known as the NAV (network allocation vector) timer. The timer tracks reservations of the network by other nodes. For example, each MAC layer data frame includes a duration field indicating the length of time for which the medium will be reserved to transmit the data frame and its acknowledgement. This duration, incorporating the packet duration, the duration of any expected acknowledgement, and an appropriate interframe spacing (IFS) will be the NAV timer initial value. IFS values are predefined based on priority levels. SIFS is the shortest interframe spacing and provides the highest priority level. PIFS is longer than SIFS and thus indicates a lower priority. PIFS is used by PCF. DIFS is typically used by DCF and is longer than PIFS. There is also an EIFS (extended interframe spacing) period.

To alleviate hidden terminal problems, transmission of a data frame may be preceded by an exchange of Request to Send (RTS) and Clear to Send (CTS) frames. This scheme is referred to as multiple access collision avoidance (MACA). These frames will include duration fields indicative of the reservation time for the cycle of transmissions involved in communicating and acknowledging the data frame. The NAV timer value can then be set in response to this duration value even if the data packet is not heard.

The NAV timer counts down from its initialization value to zero. After expiration of the timer and the specified IFS period, there will be a backoff time before a node can transmit. The backoff time is computed to be the product of a locally computed random number and a system slot time. The random number generation is uniformly distributed between 0 and CW, a contention window value. In the event of a packet collision, this same backoff time computation is used to determine the timing of a retransmission attempt following an EIFS period. If the physical layer detects a busy condition, the backoff timer stops counting down until the medium becomes idle.

The present invention is not to be considered as limited to the above-described environment.

Establishment of System Timing Parameters

Embodiments of the present invention avoid collisions and improve system throughput by adjusting timing parameters such as the NAV timer value and the system slot time. These adjustments are based on a systematic collection of propagation delay measurements in network 100. These delays may be readily measured based on departure and arrival times of RTS and CTS frames, respectively, as measured at root bridge 102. The updated common slot time value is calculated based on the maximum propagation delay, i.e., aSlotTimeAdj=aSlotTime+tmax, where aSlotTime is a fixed duration, such as 9 microseconds for 802.11a and 20 microseconds for 801.11b, and tmax is the longest measured link delay.

Figure 3:
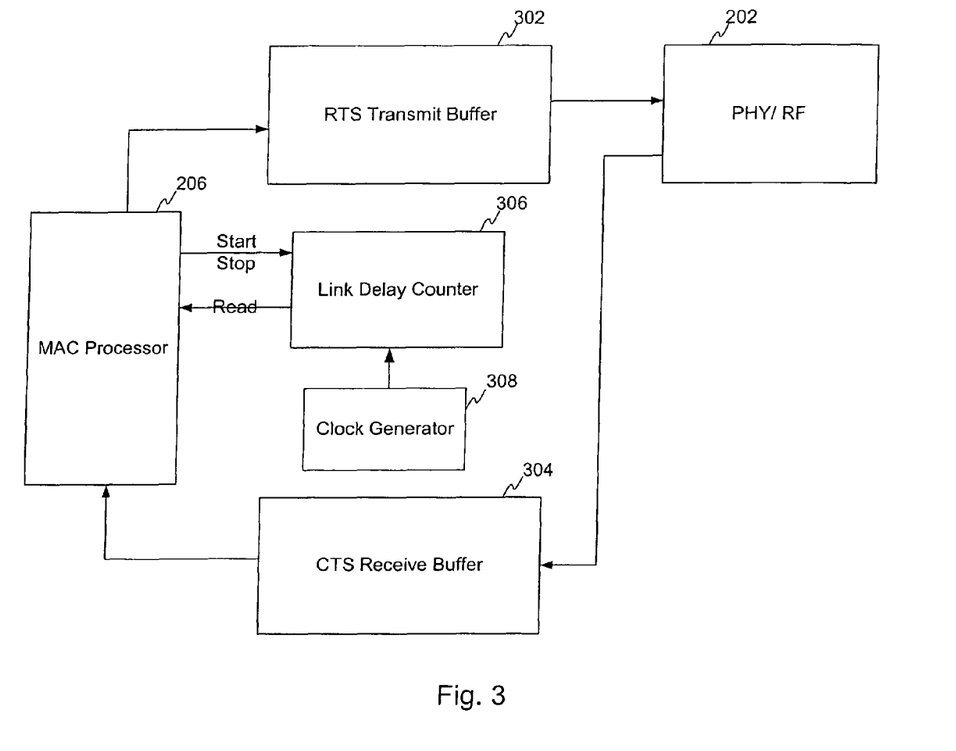
FIG. 3 depicts elements of a link delay measurement subsystem according to one embodiment of the present invention.

FIG. 3 depicts a link delay measurement system 300 to be incorporated into bridge station 200. RTS frames to be sent are accumulated in an RTS buffer 302 while received CTS frames are accumulated in a CTS buffer 304. A link delay counter 306 runs after RTS transmission until receipt of the CTS and is clocked by a clock generator 308.

Root bridge 102 measures delays repeatedly and averages the measured delay on each link. The link delays are distributed to the non-root bridges along with a newly computed system slot time.

Figure 4:
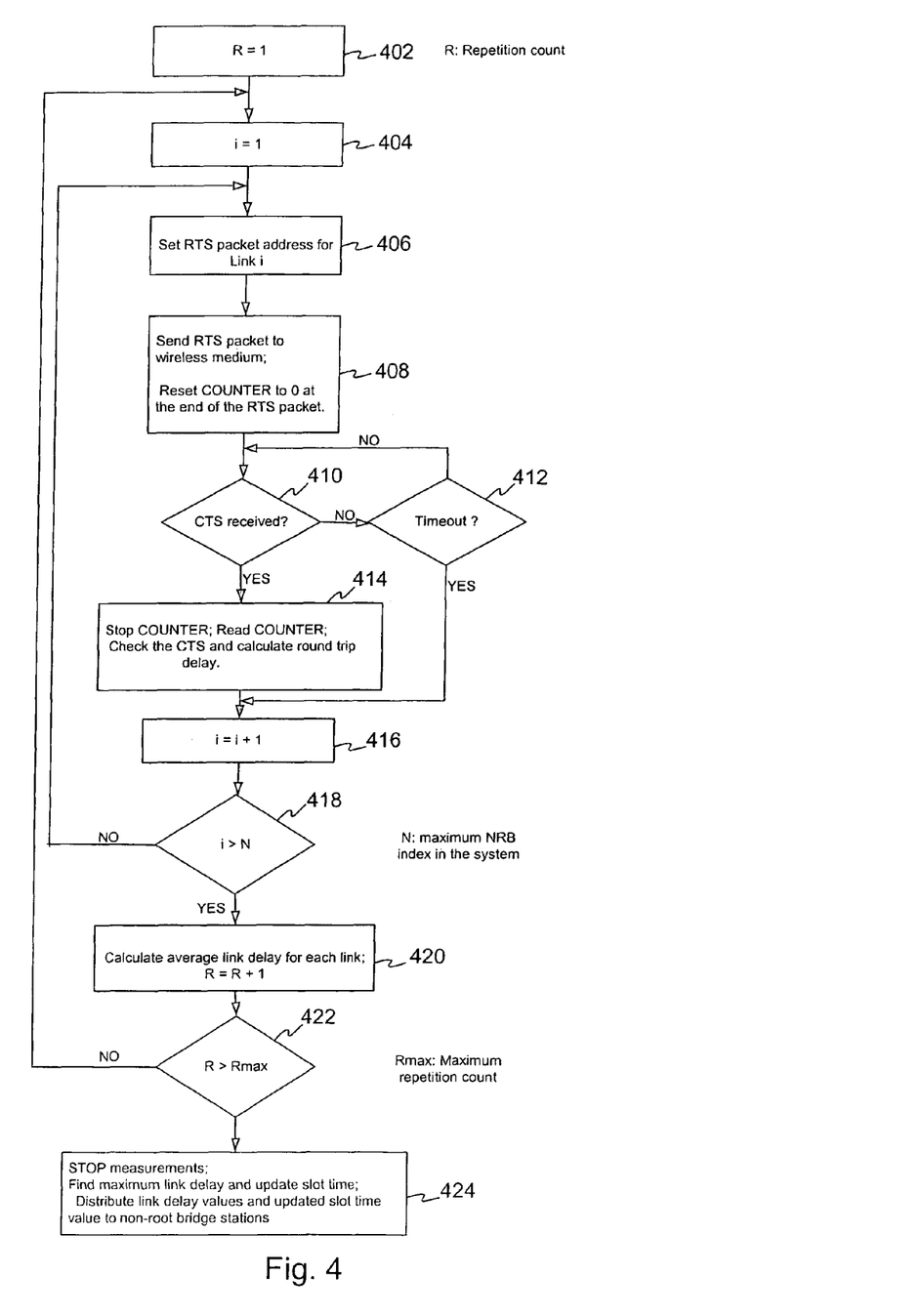
FIG. 4 is a flowchart describing steps of roundtrip delay measurement and parameter distribution according to one embodiment of the present invention.

FIG. 4 is a flowchart describing steps of roundtrip delay measurement and parameter distribution according to one embodiment of the present invention. A step 402 sets a repetition counter to R=1. At step 404, a link index is set to i=1.

At step 406, the packet address of the next RTS frame to be sent from RTS transmit buffer 302 is set to the non-root bridge for link i. At step 408, link delay counter 306 is reset to zero when this RTS frame in RTS transmit buffer 302 is ready to be sent to the physical layer/RF block 202, and then starts to count clock cycles of clock generator 308. The clock frequency of the clock generator, aClockFreq in MHz, should be sufficiently high, for example, 10 MHz, to provide adequate resolution in link delay measurement. The RTS frame is fully sent to the wireless medium after the duration of the RTS frame, aRTSTime, plus some physical layer/RF device delays, aRFTxDelay. Then the RTS frame arrives at a specified non-root bridge after the propagation delay on the link between the root bridge and the non-root bridge, aPropagationDelay. The non-root bridge processes the RTS frame within a specified SIFS time, aSIFSTime, and then send a CTS frame to the root bridge in aSIFSTime from the RTS frame receive completion at the receiver physical layer/RF block. The CTS frame arrives at the root bridge after the propagation delay on the wireless medium, aPropagationDelay. The MAC processor confirms the CTS frame after the CTS packet duration, aCTSTime, plus a physical layer/RF delay, aRFRxDelay, plus a MAC processing delay, aMACPrcDelay.

A step 410 tests for arrival of the CTS packet. As long as step 412 does not detect a timeout condition, step 410 repeats until the arrival of the CTS frame. When MAC processor 206 identifies the CTS frame from the non-root bridge, at step 414, it stops link delay counter 306, and then read the counter value, aCounterValue. Then, also at step 414, MAC processor 206 calculates the roundtrip delay, aRoundTripDelay in microseconds, as follows:

$$aRoundTripDelay = aCounterValue/aClockFreq - aRTSTime - aCTSTime - aSIFSTime - aRFRxDelay - aMACPrcDelay.$$

The aRFRxDelay and aMACPrcDelay are substantially fixed values in the bridge system, and can be measured in a laboratory environment. The aRFTxDelay value is included in the roundtrip delay value. The link delay, aLinkDelay, is obtained by dividing the aRoundTripDelay by 2.

A step 416 increments the link index i. Step 416 can also be reached after a timeout of link delay counter 306 as would be detected at step 412. A step 418 tests whether i is greater than N, the number of non-root bridges in the system. If not, the next link is measured by returning to step 406. If all of the links have been visited in this repetition of the link measurement algorithm, a step 420 computes an average link delay for each link based on the measurement repetitions. A step 422 then tests whether R, the repetition index, has exceeded a maximum. If it has not, another round of measurements of all the link delays begins by returning to step 404.

If the desired number of repetitions has been completed then final calculations are completed at a step 424. The root bridge updates a common slot time value, aSlotTimeAdj, based on a maximum link delay value, aMaxLinkDelay, selected from the measured average link delay values, i.e., aSlotTimeAdj=aSlotTime+aMaxLinkDelay.

The common slot time value and the link delays are distributed to all non-root bridges via MAC layer management frames.

When the root bridge receives an Association Request message from a non-root bridge that wants to join the existing wireless bridge network, the root bridge starts to measure the link delay on the new link after finishing the usual association procedures. Upon the root bridge receiving a Disassociation Request message from a non-root bridge, it deletes the non-root bridge from the non-root bridge list immediately, updates the maximum link delay value and the common slot time value, and then distributes the updated values to all non-root bridges in the newly configured bridge network.

As the root bridge usually needs to send much more traffic to non-root bridges than vice versa, it is preferable to give it priority in accessing the wireless medium. After measuring link delays and updating the common time slot value, the root bridge may employ PIFS rather than SIFS in computing its NAV timer value while the non-root bridges employs DIFS where aPIFSTime=aSIFSTime+aSlotTimeAdj and aDIFSTime=aSIFSTime+2×aSlotTimeAdj. With the shorter deferral time, the non-root bridge is more likely to seize control of the wireless medium.

Alternatively, the transmission deferral times for non-root bridges are adjusted based on distance from the root bridge or some other parameter. All else being equal, longer links have lower throughput due to the greater effects of noise and interference. One can divide the non-root bridges into groups. For example, the various groups may have aDIFSTime values of aSIFSTime+2×aSlotTimeAdj, aSIFSTime+3×aSlotTimeAdj, aSIFSTime+4×aSlotTimeAdj, etc.

Packet Transmission Using System Timing Parameters

Figure 5:
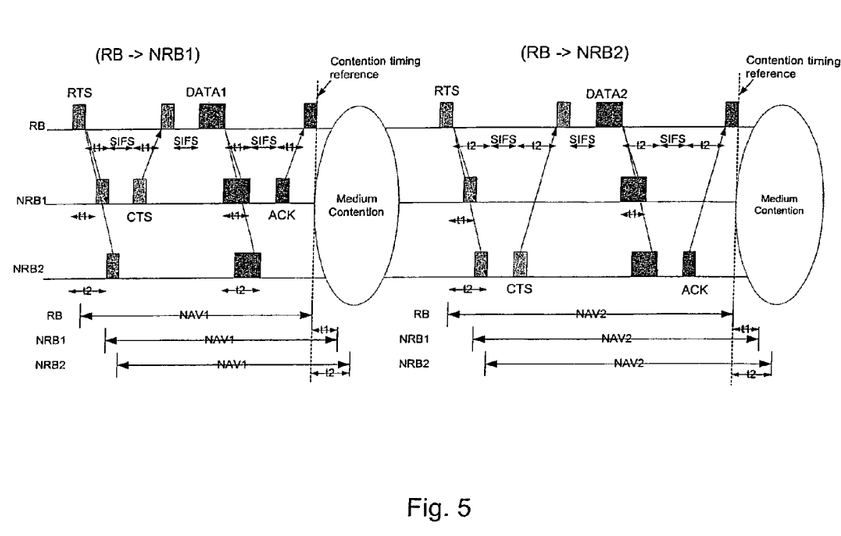
FIG. 5 depicts the timing of transmissions from a root bridge to a non-root bridge according to one embodiment of the present invention.
Figure 6:
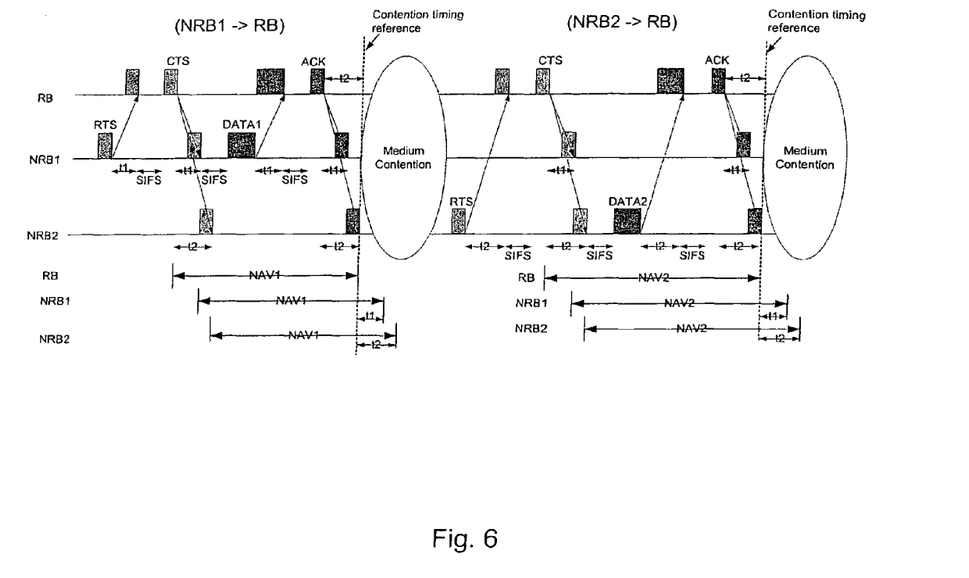
FIG. 6 depicts the timing of transmissions from a non-root bridge to a root bridge according to one embodiment of the present invention.

FIGS. 5-6 illustrate a cycle of packet transmissions in a simplified bridge system that is composed of a root bridge and two non-root bridges, NRB1 and NRB2. The non-root bridges have disparate link paths and link delays to the root bridge. The delay between the root bridge and NRB1 is t1 while the delay to NRB2 is t2. FIG. 5 shows packet transmissions for transmitting data from the root bridge, while FIG. 6 shows packet transmissions for transmitting data from the non-root bridges.

One set of packet transmissions under the rule of MACA is composed of an RTS packet and a CTS packet followed by a DATA packet and an ACK (Acknowledge) packet. NAV1 (Network Allocation Vector 1) and NAV2 (Network Allocation Vector 2) are contention-free durations, which are set by the root bridge to protect DATA packets from collisions on the wireless medium. The root bridge calculates the NAV value of each set of MACA packets, which includes the durations of RTS, CTS, DATA, and ACK packets, SIFS, and link delays. Then the root bridge distributes the NAV values to all non-root bridges via the RTS and CTS packets.

In FIG. 5, for the first set of MACA packet transmissions, the duration of NAV1, aNAV1Time, is calculated at the root bridge as follows:

$$aNAV1Time = 4 \times t1 + 3 \times aSIFSTime + aCTSTime + aDATA1Time + aACKTime,$$

where aSIFSTime, aCTSTime, aDATA1Time, and aACKTime are the durations of SIFS, CTS, DATA1, and ACK, respectively. If each non-root bridge subtracts its own link delay from the received NAV value, the wireless bridge system can have a common timing reference for medium contention among all bridge stations. Accordingly, NRB1 adjusts its packet duration value to aNAV1Time−t1, and NRB2 adjusts its NAV value to aNAV1Time−t2. This guarantees fairness in the starting point of medium contention for the next packet transmission for all bridge stations.

Likewise, for the second set of MACA packet transmissions, the duration of NAV2, aNAV2Time, is calculated at the root bridge as follows:

$$aNAV2Time=4\times t2+3\times aSIFSTime+aCTSTime+aDATA2Time+aACKTime,$$

where aDATA2Time is the duration of DATA2. The timing alignment procedures are the same as in the first set of MACA packets.

If RTS/CTS packets are not used prior to sending a DATA1 packet with the duration of aDATA1Time, the duration value in the DATA1 packet, aDuration, can be calculated at the root bridge as follows:

$$aNAV1Time=2\times t1+aSIFSTime+aDATA1Time+aACKTime.$$

NRB1 then adjusts its packet duration value to aNAV1Time−t1, and NRB2 adjusts its NAV value to aNAV1Time−t2, resulting in guaranteed fairness in the starting point of medium contention for the next packet transmission.

Referring now to the first MACA packet transmissions in FIG. 6, NRB1 sends an RTS packet with its NAV value, aNAV1TimeRTS as calculated by:

$$aNAV1TimeRTS=3\times aSIFSTime+aCTSTime+aDATA1Time+aACKTime.$$

The root bridge calculates its NAV1 value, aNAV1Time, from the NAV value in the received RTS packet, as below:

$$aNAV1Time=aNAV1TimeRTS-aCTSTime-aSIFSTime+2\times t1+t2,$$

where t2 is the largest propagation delay in the bridge system.

As in FIG. 5, each non-root bridge adjusts its received NAV value in the CTS packet by its own link delay. Thus, NRB1 adjusts its NAV value to aNAV1Time−t1, and the NRB2 adjusts its NAV value to aNAV1Time−t2.

Referring now to the second set of MACA packet transmissions in FIG. 6, the NRB2 sends an RTS packet with its NAV value, aNAV2TimeRTS as below:

$$aNAV2TimeRTS=3\times aSIFSTime+aCTSTime+aDATA2Time+aACKTime.$$

Then the root bridge calculates the NAV2 value, aNAV2Time, from the NAV value in the received RTS packet, as follows:

$$aNAV2Time=aNAV2TimeRTS-aCTSTime-aSIFSTime+2\times t2+t2.$$

This procedure can be generalized to any number of non-root bridges by replacing t2 in the above equation with a maximum link delay value, $t_{max}$, in the bridge system.

In each case, after expiration of the NAV timer, or after another type of medium busy detection, the backoff time is a locally computed random number multiplied by the system slot time which has been computed as previously described.

Theoretical Background

An analysis of collision probabilities in an 802.11-based bridge system that does not employ the modifications provided by embodiments of the present invention will now be presented.

A point-to-multipoint system with directional antennas at non-root-bridges is a kind of "ALOHA" system, in which each non-root bridge cannot hear the other non-root bridges while the root bridge can hear all non-root bridges. ALOHA systems are described in detail in N. Abramson, "The Aloha System—Another Alternative for Computer Communications," 1970 Fall Joint Computer Conference, AFIPS Conference Proceedings, AFIPS Press, Montvale, N.J., vol. 37, pp. 281-285 (1970), the contents of which are herein incorporated by reference in their entirety. In this situation, it is well known that a non-slotted (packet transmissions are not based on a shared timing reference) ALOHA system with evenly distributed packet transmit probability on each time slot at each station has two times packet collision probability and a half throughput of the corresponding slotted ALOHA system. Similarly, in a point-to-multipoint bridge system where all non-root bridges are equidistant from the root bridge in CSMA/CA mode, if all bridge stations have an initial common contention window value ($aCW_{min}$), the packet collision probability at the 1st attempt on a time slot for the downlinks is given as follows:

$$Pr(1^{st}\ collision)=1-[1-1/(aCW_{min}+1)]^{(N-1)},$$

if time slot boundaries of bridge stations are well aligned;

$$Pr(1^{st}\ collision)=1-[1-(1+T_d/T_{slot})/(aCW_{min}+1)]^{(N-1)},$$

if time slot boundaries of bridge stations are randomly distributed, where $aCW_{min}$ is a minimum contention window, N is the number of bridge stations in the system, $T_d$ is the common link propagation delay, and $T_{slot}$ is an updated slot time, that is, $T_{slot}$=aSlotTime+$T_d$, where aSlotTime is a slot time value specified in the 802.11 standard, such as 9 microseconds for 802.11a and 20 microseconds for 802.11b.

Figure 7:
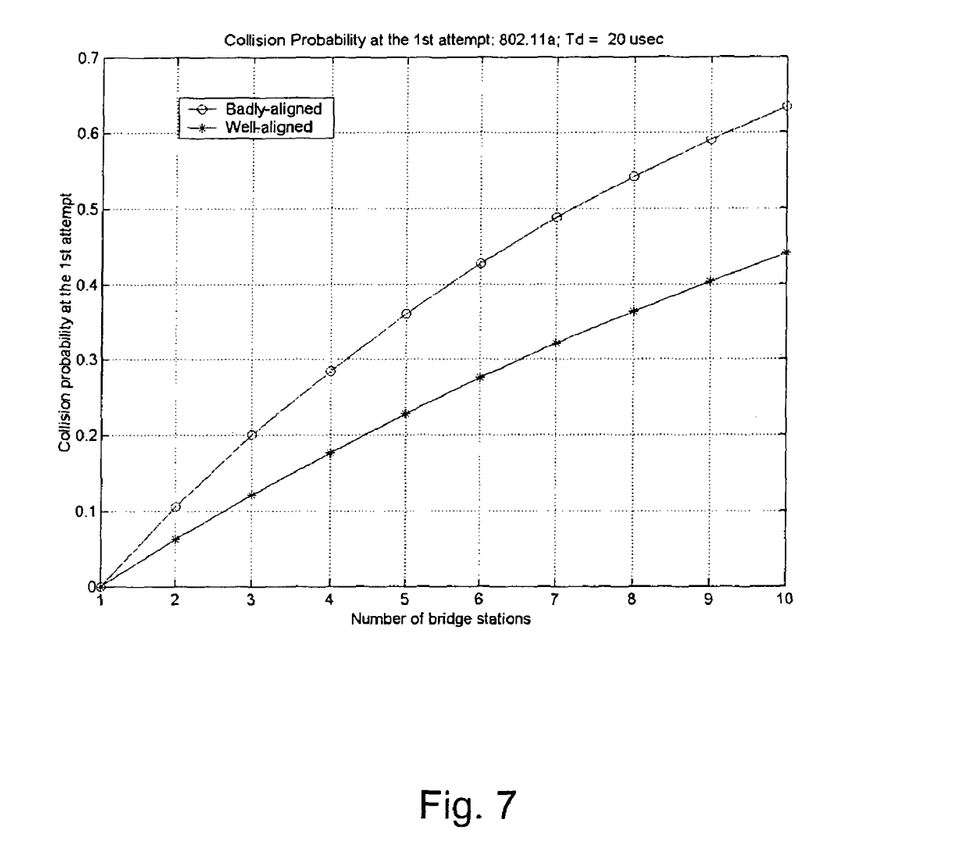
FIG. 7 depicts downlink collision probabilities in an IEEE 802.11a system.
Figure 8:
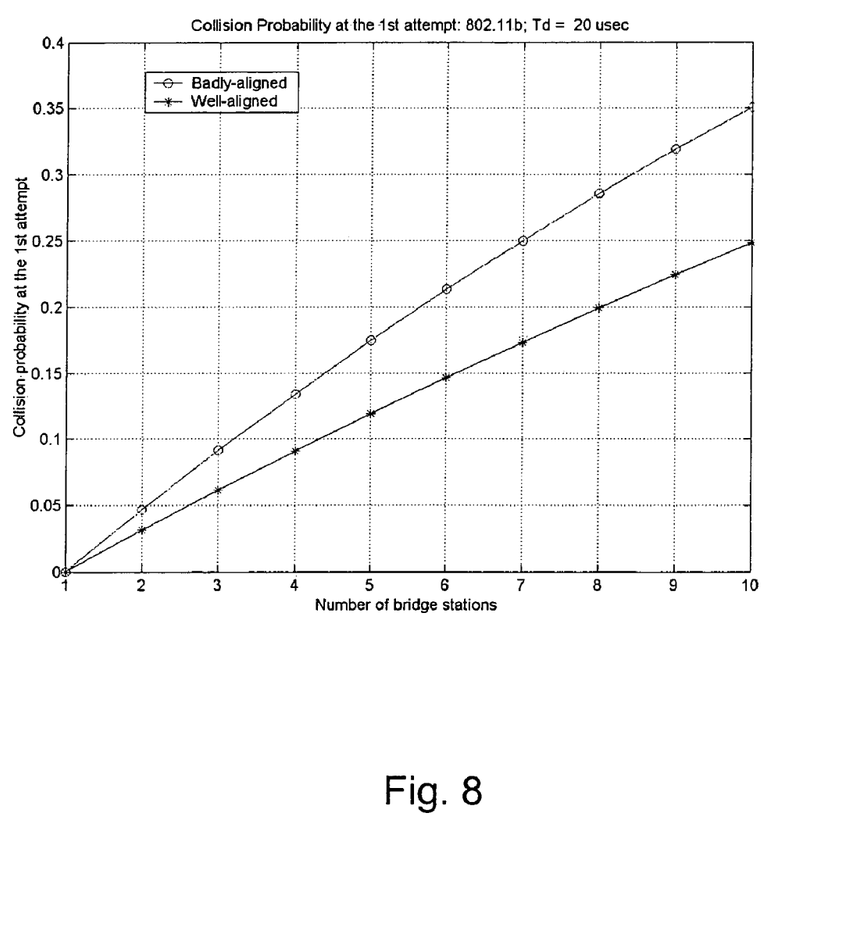
FIG. 8 depicts downlink collision probabilities in an IEEE 802.11b system.

As shown in the above equations, the packet collision probability at the $1^{st}$ attempt increases as the number of bridge stations and the propagation delays increase. As propagation delays on the links increase, packet collision probability in an 802.11a system increases more rapidly than in an 802.11b system. This is due to shorter slot time values and smaller $aCW_{min}$ values. FIGS. 7-8 illustrate collision probabilities according to the above equations. FIG. 7 depicts collision probability on the first attempt on downlinks. FIG. 7 assumes the use of 802.11a and Td=20 microseconds, corresponding to a link distance of about 4 miles. FIG. 2 depicts collision probability on the first attempt on 802.11b downlinks, based on similar assumptions.

As shown in FIG. 7, a point-to-multipoint bridge system composed of multiple bridge stations (e.g., N=6) with misaligned time slot boundaries shows high collision probability at the first attempt (e.g., 0.43 for N=6, $T_d$=20 microseconds). Likewise, as shown in FIG. 8, the packet collision probability in an 802.11b point-to-multipoint bridge system increases as the number of non-root bridge stations increases and also as the link length increases, while the overall collision probabilities are lower than those of corresponding 802.11a point-to-multipoint bridge systems. This is due to a larger slot time (20 microseconds) and aCWmin value (31) than those of 802.11a systems (9 microseconds and 16, respectively).

Although the exponential backoff algorithm of the 802.11 MAC protocol decreases the collision probabilities at the second and following packet transmit attempts, the first packet collision probability affects the overall trend in collision probability and packet transmit delay. Thus the packet collision probability at the first attempt can be a good measure for comparing the performances of 802.11 bridge systems with well aligned and badly aligned time slot boundaries.

The packet collision probability among the non-root bridge stations, which are hidden to each other, can also be calculated approximately for the uplinks of a point-to-multipoint system in CSMA/CA mode employing RTS/CTS as follows:

$$Pr(1^{st} \text{collision}) = 1 - [1 - 1/(aCW_{min}+1)]^{(M-1)*(1+C)},$$

if time slot boundaries of bridge stations are well-aligned;

$$Pr(1^{st} \text{collision}) = 1 - [1 - (1+T_d/T_{slot})/(aCW_{min}+1)]^{(M-1)*(1+C)},$$

if time slot boundaries of bridge stations are randomly distributed, where M is the number of non-root bridge stations in the system, $C=T_c/T_{slot}$, Tc is the duration of one RTS plus and one SIFS, that is, $T_c$=aRTSTime+aSIFSTime, where
aRTSTime is the packet duration of RTS and aSIFSTime is the SIFS duration specified in the 802.11 standard, such as 16 microseconds and 10 microseconds for 802.11a and 802.11b, respectively. The aRTSTime depends on physical layer transmission rates; e.g., it may be 47, 33, and 27 microseconds for 6, 12, and 24 Mbps, respectively, in an 802.11a system, and 256 and 176 microseconds for 1 and 2 Mbps, respectively, in an 802.11b system. The other parameters are the same as defined earlier.

Figure 9:
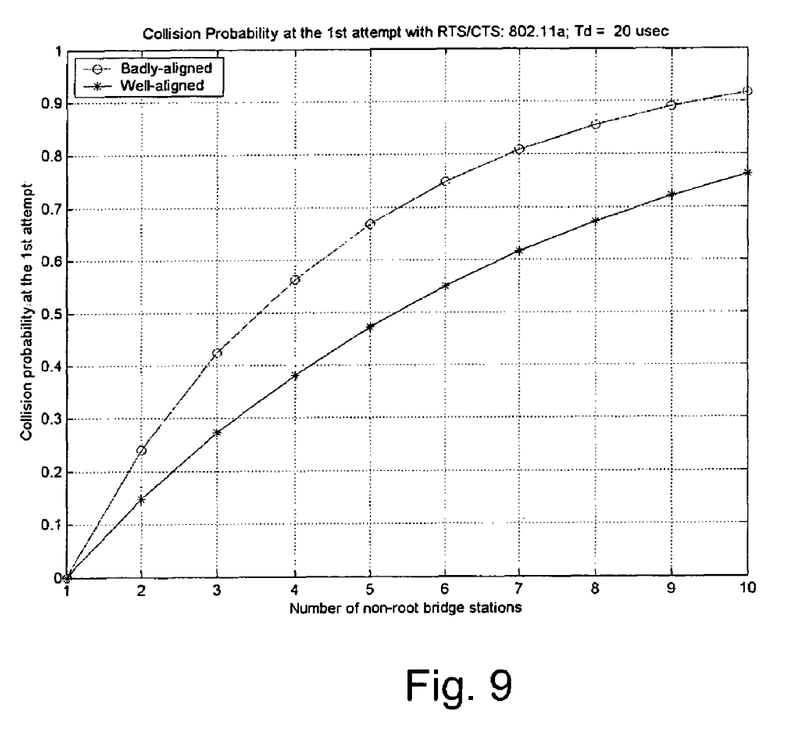
FIG. 9 depicts uplink collision probabilities in an IEEE 802.11a system.
Figure 10:
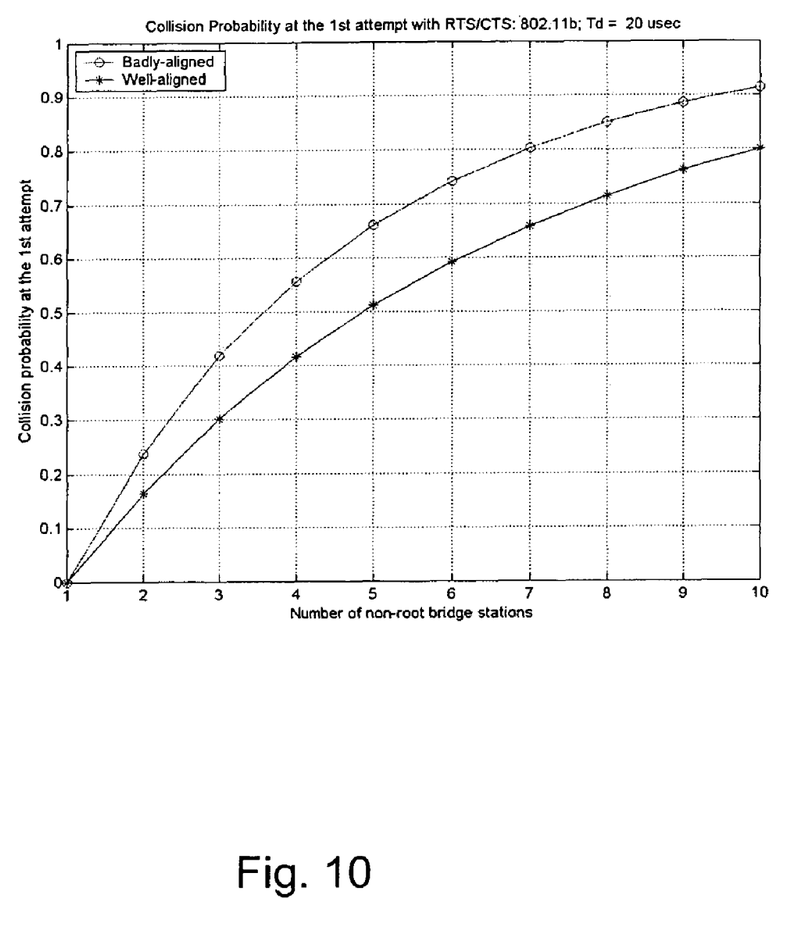
FIG. 10 depicts uplink collision probabilities in an IEEE 802.11b system.

FIGS. 9-10 illustrate the uplink collision probabilities. FIG. 9 gives the collision probability at the first attempt employing RTS/CTS on uplinks. FIG. 9 assumes the use of 802.11a, an RTS/CTS rate of 24 Mbps, and a $T_d$=20 microseconds, corresponding to a link distance of about 4 miles. FIG. 10 makes the same assumptions as FIG. 9 but for 802.11b. As can be seen in FIGS. 9-10, the collision probability of an RTS packet on the first attempt is higher on the uplink than on the downlink.

Without the modifications provided by embodiments of the present invention, it will be seen that throughput will be severely impacted by collisions in 802.11 point to multipoint wireless bridge systems. Aligning contention timing boundaries and modifying the system slot time based on measured link delays is very effective in reducing packet collision probability and thus improving overall system throughput.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, in alternative embodiments, delay measurements may be computed and processed by one or more of the non-root bridges. Also, embodiments of the present invention could be applied to any suitable wireless network employing an access point and stations where propagation delays cause the MAC layer protocol to break down.

The invention claimed is:

1. A method for operating a point-to-multipoint wireless communication network, said method comprising:
measuring link delays between a root bridge and a plurality of non-root bridges;
calculating a common time slot value based on said measured link delays, wherein said common time slot value is calculated based on a longest measured link delay;
distributing said measured link delays and said common time slot value to said non-root bridges within said point-to-multipoint wireless communication network; and
aligning contention timing boundaries based on said measured link delays and said common time slot values to coordinate transmissions and reduce the probability of collision in a carrier-sense multiple access with collision avoidance scheme;
wherein aligning contention timing boundaries comprises adjusting a network allocation vector.

2. The method of claim 1 wherein measuring and using are performed by said root bridge.

3. The method of claim 1 wherein measuring and using are performed by one of said non-root bridges.

4. The method of claim 1 wherein using comprises:
assigning transmission deferral times to said non-root bridges based on said measured link delays to give access preference to more distant ones of said non-root bridges.

5. The method of claim 1 wherein coordinating transmissions comprises adjusting a network allocation vector time.

6. The method of claim 1 further comprising:
receiving a disassociation request message from one of said plurality of non-root bridges;
deleting the non-root bridge from a non-root bridge list;
updating said common time slot value; and
distributing said updated common time slot value to said plurality of non-root bridges.

7. The method of claim 1 further comprising:
receiving an association request message from a new non-root bridge that wants to join the point-to-multipoint wireless communication network; and
measuring link delays between said root bridge and said new non-root bridge.

8. The method of claim 1 further comprising computing a network allocation vector timer value utilizing point coordination function interframe spacing at the root bridge, wherein said non-root bridges utilize distributed coordination function interframe spacing.

9. A method for operating a node in a point-to-multipoint wireless communication network, said method comprising:
receiving a measured link delay and a system slot time from another node, said system slot time calculated based on said measured link delay; and
using said measured link delay and said system slot time to coordinate transmissions and reduce the probability of collision in a Carrier Sense Multiple Access with Collision Avoidance (CSMA/CA) scheme;
wherein coordinating transmissions comprises aligning contention timing boundaries based on said measured link delay and said common slot time, said contention timing boundaries comprising a network allocation vector.

10. A method for operating a point-to-multipoint wireless communication network, said method comprising:
measuring link delays between an access point and a plurality of stations; and
using said measured link delays to coordinate transmissions and reduce the probability of collision in a Carrier Sense Multiple Access with Collision Avoidance (CSMA/CA) scheme, wherein using comprises calculating a common time slot value based on said measured link delays and distributing said measured link delays and said common time slot value within said point-to-multipoint wireless communication network; and aligning contention timing boundaries based on said measured link delays and said common time slot values, wherein aligning contention boundaries comprises adjusting a network allocation vector.

11. Apparatus for operating a node in a point-to-multipoint wireless communication network, said apparatus comprising:
   a link delay counter that measures delays between a root bridge and a plurality of non-root bridges; and
   a MAC processor that calculates a common time slot value based on said measured link delay, distributes said measured link delays and said common time slot value within said point-to-multipoint wireless communication network, uses said measured link delays to coordinate transmissions and reduce the probability of collision in a CSMA/CA scheme, and aligns contention timing boundaries based on said measured link delays and said common time slot values, said containing timing boundaries comprising a network allocation vector.

12. The apparatus of claim 11 wherein said node is said root bridge.

13. The apparatus of claim 11 wherein said node is one of said non-root bridges.

14. The apparatus of claim 11 wherein said MAC layer processor assigns transmission deferral times to said non-root bridges based on said measured link delays to give access preference to more distant ones of said non-root bridges.

15. The apparatus of claim 11 wherein said link delays are measured based on departure time of Request to Send frames and arrival time of Clear to Send frames.

16. Apparatus for operating a node in a point-to-multipoint wireless communication network, said apparatus comprising:
   a physical layer block that receives a measured link delay and a system slot time from another node, said system slot time calculated based on said measured link delay; and
   a MAC layer processor that uses said measured link delay and said system slot time to coordinate transmissions and reduce the probability of collision in a CSMA/CA scheme;
   wherein contention timing boundaries are aligned based on said measured link delay and said common slot time, said contention timing boundaries comprising a network allocation vector.

17. Apparatus for operating a point-to-multipoint wireless communication network, said apparatus comprising:
   a link delay counter that measures link delays between an access point and a plurality of stations; and
   a MAC layer processor that calculates a common time slot value based on said measured link delay, distributes said measured link delays and said common time slot value within said point-to-multipoint wireless communication network, uses said measured link delays to coordinate transmissions and reduce the probability of collision in a CSMA/CA scheme, and aligns contention timing boundaries based on said measured link delays and said common time slot values, said contention timing boundaries comprising a network allocation vector.

18. The apparatus of claim 17 wherein the MAC layer processor is configured to set a network allocation vector of each set of multiple access collision avoidance packets.

19. The apparatus of claim 17 wherein said link delay counter tracks a time between transmitting a Request to Send (RTS) frame and receiving a Clear to Send (CTS) frame and calculates said link delay by subtracting a value for said RTS frame, said CTS frame and processing time.

20. Apparatus for operating a point-to-multipoint wireless communication network, said apparatus comprising:
   means for measuring link delays between a root bridge and a plurality of non-root bridges;
   means for using said measured link delays to coordinate transmissions and reduce the probability of collision in a CSMA/CA scheme, wherein means for using comprises means for calculating a common time slot value based on said measured link delays and distributing said measured link delays and said common time slot value within said point-to-multipoint wireless communication network; and
   means for aligning contention timing boundaries based on said measured link delays and said common time slot values, said contention timing boundaries comprising a network allocation vector.

21. A non-transitory computer-readable medium storing computer executable instructions for operating a point-to-multipoint wireless communication network, said instructions comprising:
   code that causes measurement of said link delays between a root bridge and a plurality of non-root bridges;
   code that causes use of said measured link delays to coordinate transmissions and reduce the probability of collision in a CSMA/CA scheme, wherein said measured link delays is used in calculating a common time slot value based on said measured link delays and distributed along with said common time slot value within said point-to-multipoint wireless communication network; and
   code that causes alignment of contention timing boundaries based on said measured link delays and said common time slot values, said contention timing boundaries comprising a network allocation vector.

* * * * *